United States Patent [19]

Chabrolle

[11] 4,400,752

[45] Aug. 23, 1983

[54] MAGNETO-ELECTRIC TRANSDUCER FOR A MAGNETIC RECORDING SYSTEM AND RECORDING SYSTEM COMPRISING SUCH A TRANSDUCER

[75] Inventor: Jacques Chabrolle, Bagnolet, France

[73] Assignee: LCC-CICE Compagnie Europeene de Composants Electroniques, Bagnolet, France

[21] Appl. No.: 169,353

[22] Filed: Jul. 16, 1980

[30] Foreign Application Priority Data

Jul. 20, 1979 [FR] France .................................. 79 18811

[51] Int. Cl.³ ............................ G11B 5/12; G11B 5/22
[52] U.S. Cl. ..................................... 360/112; 360/113; 360/119; 360/123; 360/125
[58] Field of Search ................................ 360/112–113, 360/119, 123, 125; 324/251, 252; 338/32 R, 32 H

[56] References Cited

U.S. PATENT DOCUMENTS

| | | | |
|---|---|---|---|
| 3,146,317 | 8/1964 | Kuhrt et al. | 360/112 |
| 3,921,217 | 11/1975 | Thompson | 360/113 |
| 3,945,038 | 3/1976 | Lazzari | 360/113 |
| 4,195,323 | 3/1980 | Lee | 360/113 |
| 4,300,177 | 10/1981 | Koel et al. | 360/113 |

OTHER PUBLICATIONS

IBM Tech. Disc. Bull., R. J. Gambino et al, Magnetic Films for Hall Effect Devices for Magnetic Recording Heads, vol. 18, No. 12, May 1976, pp. 4214–4217.

Primary Examiner—Alfred H. Eddleman
Attorney, Agent, or Firm—Cushman, Darby & Cushman

[57] ABSTRACT

The invention is directed to transducers for recording on (writing) and playback from (reading) a magnetizable support medium. A single transducer (head) provides both record and playback functions. Recording is carried out using a winding for inducing an external magnetic flux across a gap in the transducer and playback is carried out by sensing an internal leakage flux using a Hall effect magneto-resistive element placed outside of a gap in the head. The magneto-resistive element delivers a substantially linear electrical signal response as a function of the magnetic field applied by relative motion between the transducer gap and the support medium.

7 Claims, 4 Drawing Figures

MAGNETO-ELECTRIC TRANSDUCER FOR A MAGNETIC RECORDING SYSTEM AND RECORDING SYSTEM COMPRISING SUCH A TRANSDUCER

BACKGROUND OF THE INVENTION

The present invention relates to the field of magnetic recording, and more precisely to the magneto-electric transducers which are used therein.

In this field, use is made of a magnetic support medium in the form of a tape of floppy disks, covered with a layer of ferro-magnetic material which forms the active part thereof.

This recording medium is moved in relation to a transducer element, comprising a magnetic circuit in ring form interrupted by a very narrow air-gap, of a length typically between 1 and 10μ, an electric circuit, formed by windings in the form of coils, surrounding the magnetic circuit.

Two functions may be assumed by such a transducer. If an alternating electric voltage is applied to the windings, a magnetic flux is created in the magnetic circuit, determining an opening-out in the art of the lines of force of a magnetic field at the air-gap; the mobile support medium, which moves in front of this latter, is thus permanently magnetized following a law of variation identical to that of the voltage applied to the transducer. This latter thus assumes the function of recording transducer or "head", and that whatever the speed of the magnetic support medium.

But in many applications, it may assume a second function: if the magnetized tape is passed a second time in front of the air-gap, it creates a variable magnetic flux in the magnetic circuit, by a phenomenon symmetrical to the preceding one, according to a law of variations identical to that of the voltage applied to the transducer in the recording phase; the transducer thus assumes the function of reading "head", after the flux variations have been converted into voltage variations by a suitable means.

Several physical phenomena have already been used to achieve this conversion.

The simplest consists in using the same windings as for the recording, and in collecting the voltages developed at their terminals, according to the laws of electro-magnetism. A serious disadvantage is however attached to such use, related to the fact that the voltages obtained e are not proportional to the magnetic flux 0 itself, but to the first derivative thereof with respect to time:

$$e = -k(d0/dt)$$

where k is a constant.

The voltage collected e depends then on the speed of travel of the magnetic support medium; it diminishes therewith and is cancelled out when the medium stops.

This is why use is made of another physical phenomenon, that known under the name of Hall effect and which is the appearance of a variable resistance of certain materials comprising particularly arsenic, indium and/or phosphorous, such as In As P, depending on the magnetic field which is applied thereto; the law of variation of this magneto-resistance is in fact linear depending on this magnetic field. The reading signal obtained has then an output level independent of the travelling speed of the support tape or disk of the recording, including complete stopping of this support medium.

A basic limitation is however attached to use of the Hall effect in the field of "heads": this is the fact that, like all the phenomena using a resistance, this effect is not reversible and that, accordingly, the Hall effect transducer does not allow recording, but only reading. The result of these limitations is that magnetic recorders, since they must operate in the field of control instruments for example, must be fitted with two distinct heads, one serving for recording, of the electro-magnetic type with coiled windings, the other for reading, with a magneto-resistance in the form of a block disposed in the flux of the magnetic circuit, usually in an air-gap of this circuit, provided for this purpose.

This requirement of two distinct transducers constitutes a serious disadvantage in the uses; it is one of the aims of the present invention to propose a single magnetic head assuming the two functions by association, in a single magnetic circuit, of a winding for recording and of a magneto-resistance for reading.

It is to be noted that the originality of the invention resides not only in the union of the two respective means described but also in their combination with the magnetic circuit, thus allowing, as will be shown hereafter, common aims sought after to be reached, by adaptation and particular localization of these means in this circuit.

In fact, as is described and explained further on, the use of a magneto-resistance is not made therein in the magnetic flux which flows in the magnetic circuit, as in the known art, an arrangement which requires an interruption in this circuit, with introduction of a harmful reluctance; on the contrary, in accordance with the invention, the magneto-resistance is therein placed in the magnetic leakage flux of the air-gap, which preserves the optimum conditions of design and operation of the magnetic head. Other advantages attached to this particular localization and derivated therefrom are described further on.

Another limitation exists, during the recording phase, in magnetic heads with windings of the known type, i.e. the non controllable behaviour of the magnetic circuit, depending, on the one hand, on the value of the induction which is created therein by the windings and, on the other hand, on the frequency of the electric signal which is applied thereto.

The value of the induction governs therein the notion of linearity and saturation to high levels, and that of the frequency governs the notion of losses, either by hysteresis and eddy currents in the magnetic material of the circuit, or by variation in the geometric form of the lines of force of the magnetic field in the vicinity of the effective air-gap.

Now, the possible use of an additional winding around the magnetic circuit would not allow the magnetic state of the circuit to be known, either absolute value, or in relative value, for the reasons already given above.

Furthermore, the monitoring winding would behave like the secondary of a transformer whose primary was formed by the recording winding, and the information collected about the magnetic state of the circuit would be completely false.

On the contrary, the magneto-resistance present in the transducer of the invention allows this magnetic state to be known directly as an absolute value during the recording phase.

Another aim of the present invention is to provide a magneto-electric transducer for magnetic recording comprising an element, with magneto-resistance, for permanently monitoring the magnetic state of the circuit of the recording head, in particular for monitoring the correct progress of the recording.

Furthermore, in a certain number of practical uses, a proportionality, or "linearity" as good as possible, is sought for between the signal applied, on recording, to the windings of the magnetic head, and the magnetic field reigning in the effective air-gap, in which, as was pointed out above, only a part of the lines of force opens out in the air to magnetize the magnetic support medium which travels, in contact therewith, in front of the active face of the head.

Now, this effective magnetic field is impossible to measure with a magnetometric means, the presence of the magnetic support medium and of the mechanical parts ensuring its proper travel being totally opposed thereto.

On the other hand, the inner side of the ring forming the magnetic circuit lends itself to the placing of a magnetometric measuring element and, in accordance with the invention, use is made of a Hall effect magneto-resistive element for thus accurately knowing the value of the effective magnetic field delivered by the air-gap, that of the internal side being proportional thereto.

The signal supplied by the measuring element may then be advantageously used for linearizing the effective field, for example by using a feedback loop circuit controlled by the magneto-resistive element.

A further aim of the invention is to provide a high linearity recording system comprising an amplifier and a magnetic head in accordance with the invention, the amplifier receiving at its input terminals the signal to be recorded, its output terminals being connected to the windings of the magnetic head, an adjustable value feedback loop being formed between the terminals of the magnetio-resistance of the magnetic head and the input of the amplifier, thus ensuring linearization of the magnetic field of the air-gap of the magnetic head with respect to the signal applied to the windings.

SUMMARY OF THE INVENTION

Thus the invention relates to a magneto-electric transducer for a magnetic recording system, on a magnetizable support medium comprising a magnetic circuit in the form of a flat ring, with cylindrical internal and external lateral surfaces having generatrices perpendicular to the plane of the ring, this ring having an air-gap opening on to said surfaces and, an electric winding in the form of a coil surrounding the ring. It comprises a magneto-sensitive element disposed opposite the air-gap on the lateral internal surface of the magnetic circuit, this element delivering an electric signal proportional to the magnetic field which is applied thereto.

DESCRIPTION OF THE DRAWINGS

The invention will be better understood with the help of the following description, with reference made to the accompanying drawings.

DESCRIPTION OF THE PREFERRED EMBODIMENTS

Figure 1:
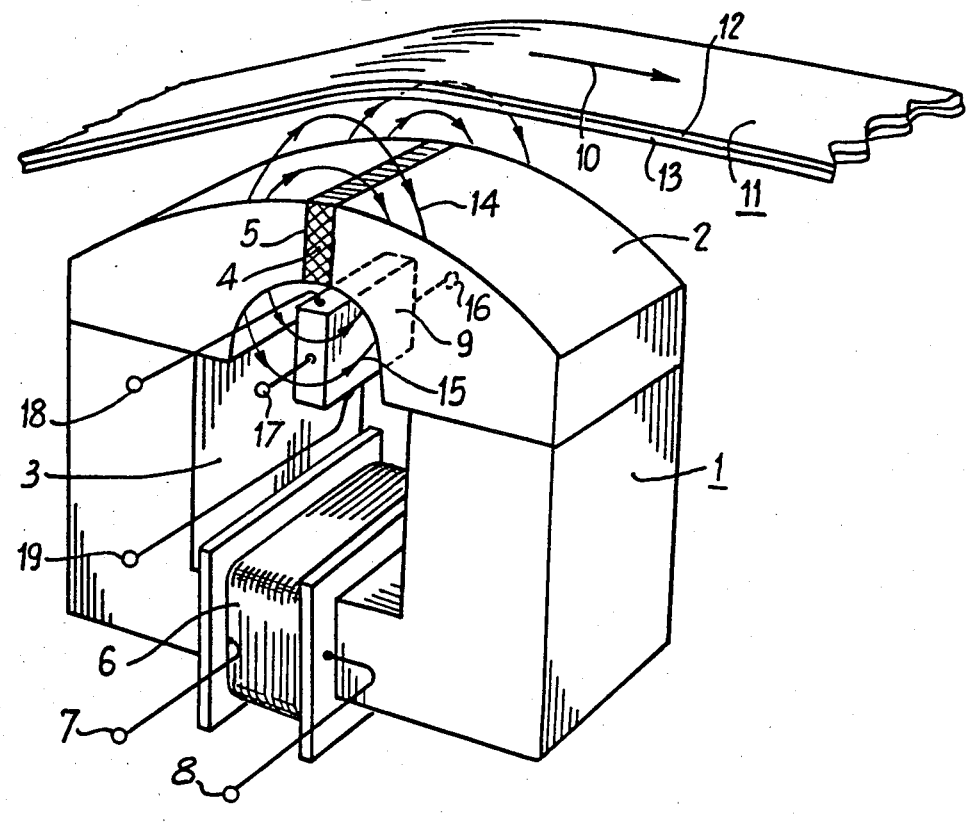
FIG. 1 shows a first embodiment of the magneto-electric transducer of the invention.

FIG. 1 shows a first embodiment of the magneto-electric transducer of the invention.

It comprises a magnetic circuit 1, having the general shape of a ring with rectangular section, whose lateral surfaces, external 2 and internal 3, are portions of a cylinder whose generatrices are perpendicular to the plane of the ring.

This circuit has an air-gap 4 in which a wedge 5 made from a non-magnetic material is present so as to accurately define the length of this air-gap, which is a fundamental datum in the applications. The circuit may be formed from any material having well-adapted magnetic characteristics, such as a soft ferro-magnetic metal alloy, or a ferrite.

The transducer comprises further electric means and, in accordance with the invention, of two types.

The first means is a winding 6, in the form of a coil, comprising two terminals 7 and 8, disposed about magnetic circuit 1; the second means is a magneto-resistive element 9, of the so-called "Hall effect" type disposed in the immediate vicinity of the effective air-gap 4, on the inner face 3, of the ring.

Such a transducer operates in the following way, in accordance with two phases corresponding respectively to recording and reading.

A magnetizable recording support medium 11, shown in the Figure in the form of a tape, travels in the direction of arrow 10 in front of the effective air-gap 4, opposite the external face 2 of the ring.

This tape is formed from a flexible mechanical base 12 and a magnetizable ferro-magnetic active layer 13.

An electric current applied to terminals 7 and 8 of winding 6 creates a magnetic flux in circuit 1, one part of the lines of force of which opens out at 14 and 15 on the two external 2 and internal 3 faces of this circuit. This external magnetic leakage field magnetizes layer 13 of the recording support tape 11.

The second electric means 9, formed by a magneto-resistance having two terminals 16 and 17 for feeding in the required energizing current, is subjected to the internal leakage field, by the lines of force 15, which determines the appearance of an electric signal at terminals 18 and 19 of the magneto-resistance.

This reading signal is linearly related to the value of the magnetic field and so allows, even at low travel speeds of the tape, this latter to be accurately known, either by instantaneous and permanent monitoring of the proper progress of the recording, during or after the recording itself or, as is shown further on, with an aim to improving the recording signal.

Figure 2:
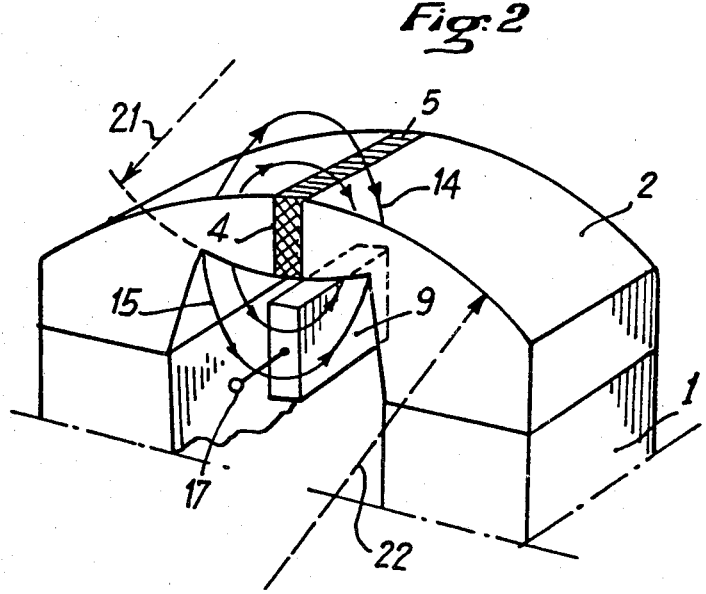
FIG. 2 shows an advantageous alternate embodiment of this transducer.

FIG. 2 shows an advantageous variation of the transducer of the invention.

It aims at making identical the two external 14 and internal 15 leakage flux existing in the region of air-gap 4, the influence of the possible presence of a tape being negligible.

Now, the distribution of the lines of force in the vicinity of an air-gap depends on the form of the surfaces of the magnetic circuit in this region, and in particular on the radii of curvature.

According to the invention, the external and internal faces of the ring, in the region of the air-gap, are given identical radii of curvature 21 and 22 for the two cylinder portions which define therein the external and internal surfaces of this region. There is then identical size and geometric distribution of the magnetic field on the two surfaces and the magneto-resistance 9 thus accounts accurately for those which exist in the region occupied by the magnetic tape.

Figure 3:
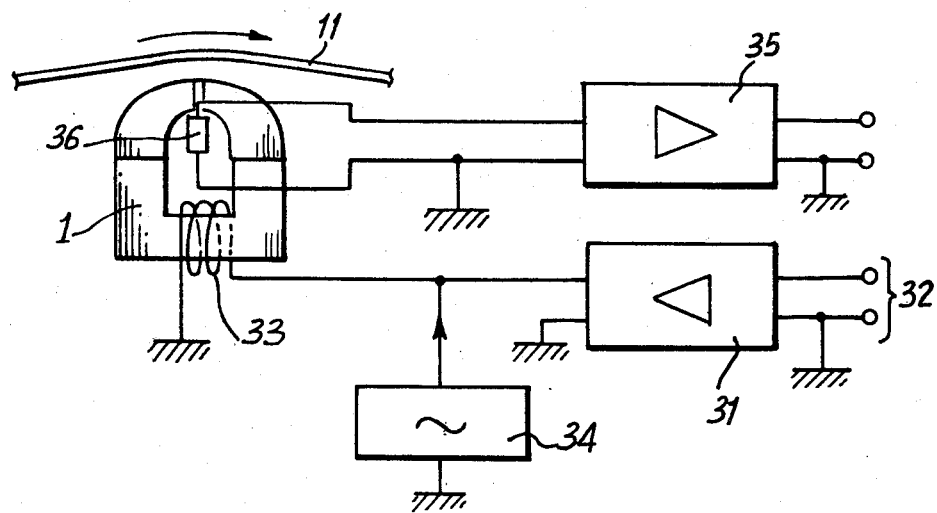
FIG. 3 shows a recording and reading system using the transducer according to the present invention.

FIG. 3 shows, in a schematical view, a recording and reading system of a magnetic tape, providing an example of use of a magneto-electric transducer in accordance with the invention. It comprises a recording amplifier 31 with input terminals 32 for the signal to be recorded and output terminals applying this signal to a winding 33 of the transducer; in accordance with a known arrangement, an oscillator 34 simultaneously applies to this winding a so-called high frequency biassing alternating signal.

The system comprises then a reading amplifier 35, with input terminals connected to the magneto-resistance 36, which collects the flux variations existing in magnetic circuit 1; this amplifier thus supplies, at its output terminals, an amplified signal, either on recording or on reading, for the different applications practiced.

Figure 4:
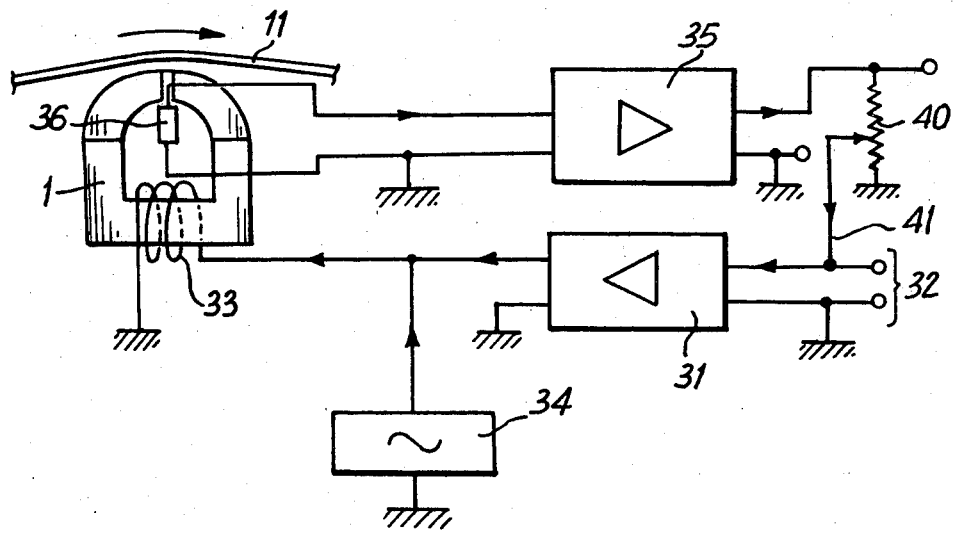
FIG. 4 shows an alternate embodiment of the recording and reading system, comprising a linearization feedback loop.

FIG. 4 shows, in a schematical view, a recording and reading system for a magnetic tape, comprising a feedback linearization loop.

This system comprises the same elements as the system of FIG. 3, but their use is made more advantageous by cooperation between the electric recording and reading circuits. It was mentioned above that, during the recording phase, the limitations to the proper proportionality, or linearity between the electric signal applied to the winding and the effective magnetic field reigning in the region of the air-gap, were due essentially to saturation phenomena of the magnetic material and of the distribution of the lines of force about the air-gap depending on the frequency.

According to the invention, there is used, during the recording phase, the signal supplied by the magneto-resistance, which accounts for the real magnetic state of the region of the air-gap, so as to oppose it, in feedback, to the signal applied to winding 33.

For that, the output terminal of the reading amplifier is connected, through an adjustable resistance bridge 40, in parallel along 41 to the input terminal of the recording amplifier 31. In accordance with the known laws regulating the feedback mechanism, there is then linearization of the whole of the recording procedure and, consequently, improvement in the final transfer curve of the magnetic tape, by use of the electro-magnetic transducer of the invention.

It should be noted that, in what has gone before, the magneto-sensitive element used is a magneto-resistance of the so-called "Hall effect" type; but the use of any other magneto-sensitive element whose output signal is linearly related to the magnetic field applied is included within the scope of the invention.

What is claimed is:
1. A magneto-electric read/write transducer, comprising:
 a magnetic circuit in the form of a flat ring having external and internal faces and a single non-magnetic gap therein, for producing (a) an external flux across the gap at its external face for interacting with a magnetizable support medium and (b) a leakage flux across the gap at its internal face;
 a coil wound about the ring for inducing a flux in the magnetic circuit; and
 a magneto-sensitive element positioned internal of the ring substantially within a region that would be subjected to the leakage flux for generating an electrical signal responsive to the leakage flux in the magnetic circuit.

2. A transducer according to claim 1, wherein the internal and external faces have a generally cylindrical form with generatrices perpendicular to the plane of the ring.

3. A transducer according to claim 1, wherein the portions of said external and internal faces on to which said air-gap opens are respectively convex and concave.

4. A transducer according to claim 1, wherein the portions of said external and internal faces on which said air-gap opens are convex.

5. A transducer according to claim 1, wherein said magneto-sensitive element is of the "Hall effect" type.

6. A magnetic recording/playback system comprising
 a magneto-electric read/write transducer including
  a magnetic circuit in the form of a flat ring having external and internal faces and a single non-magnetic gap therein, for producing (a) an external flux across the gap at its external face for interacting with a magnetizable support medium and (b) a leakage flux across the gap at its internal face;
  a coil wound about the ring for inducing a flux in the magnetic circuit; and
  a magneto-sensitive element positioned internal of the ring substantially within a region that would be subjected to the leakage flux for generating an electrical signal responsive to the leakage flux in the magnetic circuit;
 a recording amplifier having an input for coupling to a signal to be recorded and an output coupled to the coil;
 a playback amplifier having an input coupled to a signal output of the magneto-sensitive element for amplifying a read signal generated thereby and providing at an output thereof an amplified playback signal.

7. A system according to claim 6 further comprising a feedback circuit for coupling a signal from the output of the playback amplifier to the input of the recording amplifier.

* * * * *